United States Patent [19]

Piper

[11] 4,418,636
[45] Dec. 6, 1983

[54] POSITION INDICATOR FOR A TRUCK BODY

[75] Inventor: Harlow H. Piper, Decatur, Ill.

[73] Assignee: Caterpillar Tractor Co., Peoria, Ill.

[21] Appl. No.: 305,742

[22] PCT Filed: Sep. 8, 1981

[86] PCT No.: PCT/US81/01198

§ 371 Date: Sep. 8, 1981

§ 102(e) Date: Sep. 8, 1981

[87] PCT Pub. No.: WO83/00848

PCT Pub. Date: Mar. 17, 1983

[51] Int. Cl.$^3$ .......................... B60Q 11/00; B60P 1/28
[52] U.S. Cl. ................................ 116/28 R; 116/303;
414/698
[58] Field of Search ................ 116/28 R; 73/432 HA;
298/1 R; 414/698; 340/52 R, 689; 200/61.47

[56] References Cited

U.S. PATENT DOCUMENTS

| | | | |
|---|---|---|---|
| 2,324,614 | 7/1943 | Dalton | 298/1 R |
| 2,887,672 | 5/1959 | Morano et al. | 298/1 R |
| 3,137,267 | 2/1964 | Hurt | 116/28 R |
| 3,803,375 | 4/1974 | Foltz | 200/61.7 |
| 3,991,399 | 11/1976 | Jager | 116/28 R |
| 4,101,868 | 7/1978 | Bubnich et al. | 116/28 R |
| 4,116,486 | 9/1978 | Duttarer | 298/1 R |
| 4,145,682 | 3/1979 | Cook | 298/1 R X |

FOREIGN PATENT DOCUMENTS

| | | | |
|---|---|---|---|
| 2269612 | 1/1975 | France | 414/698 |
| 706200 | 3/1954 | United Kingdom | 116/28 R |
| 884086 | 12/1961 | United Kingdom | 414/698 |

*Primary Examiner*—Daniel M. Yasich
*Attorney, Agent, or Firm*—William C. Perry

[57] ABSTRACT

In the operation of a dump truck (10) it is often desirable to have an indicating means (24) provided to indicate to the operator when the truck body (14) of the vehicle is in its elevated or dumping position. It has been common practice to attach an indicator to the truck body that is visible to the operator when the truck body is down, however, this fails to provide a warning, as such, unless the operator remembers to take note of its absence before he drives away should the truck body fail to return properly. Also electrical indicators have been provided to indicate the position of the truck body, however, they rely on switches and other rather delicate componentry which is subject to damage due to the harsh environment which exists in the operation of the dump truck. The indicating apparatus (24) of this invention overcomes these problems by providing a mechanically actuated device having an indicating means (48) that is movably biased and positioned directly in front of the operator when the truck body (14) is in any position but its load carrying position (17).

9 Claims, 4 Drawing Figures

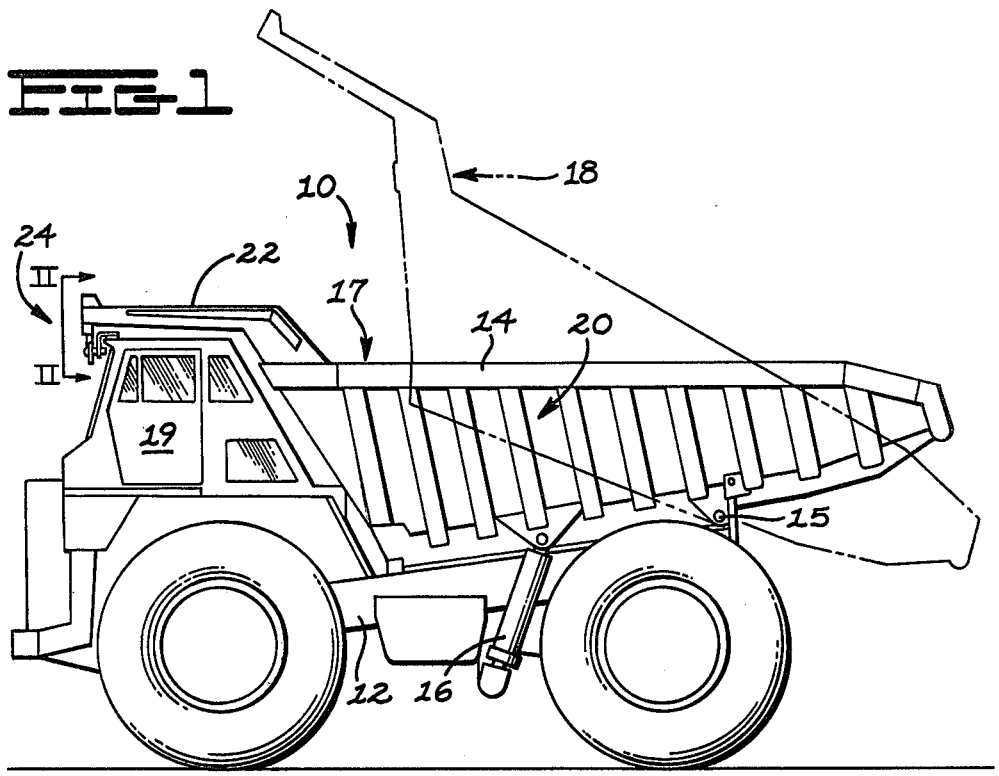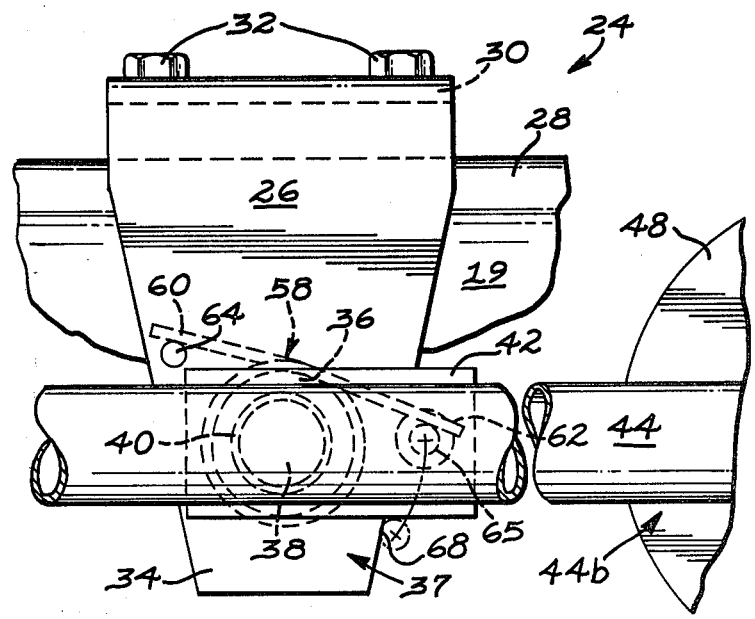

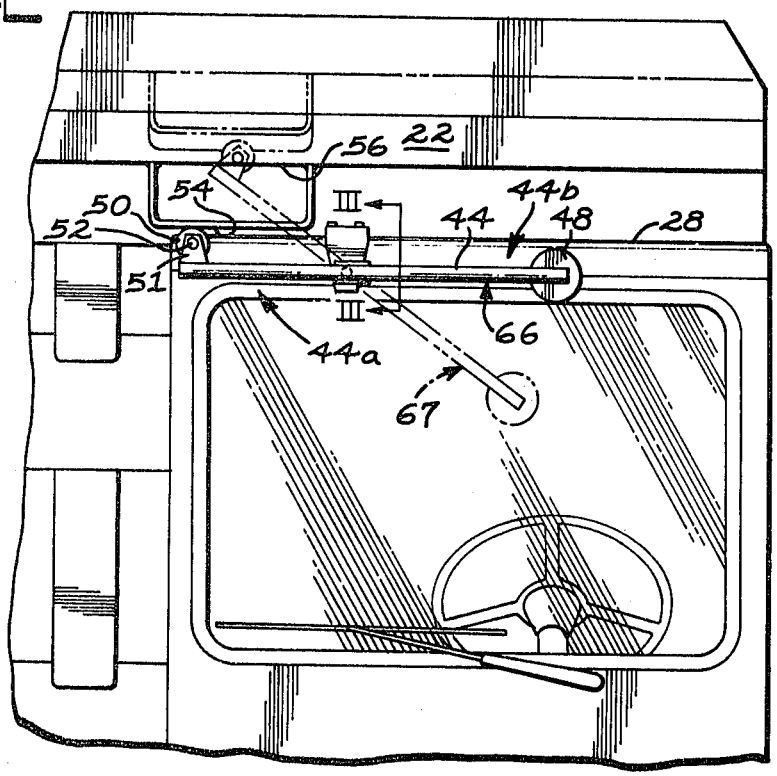
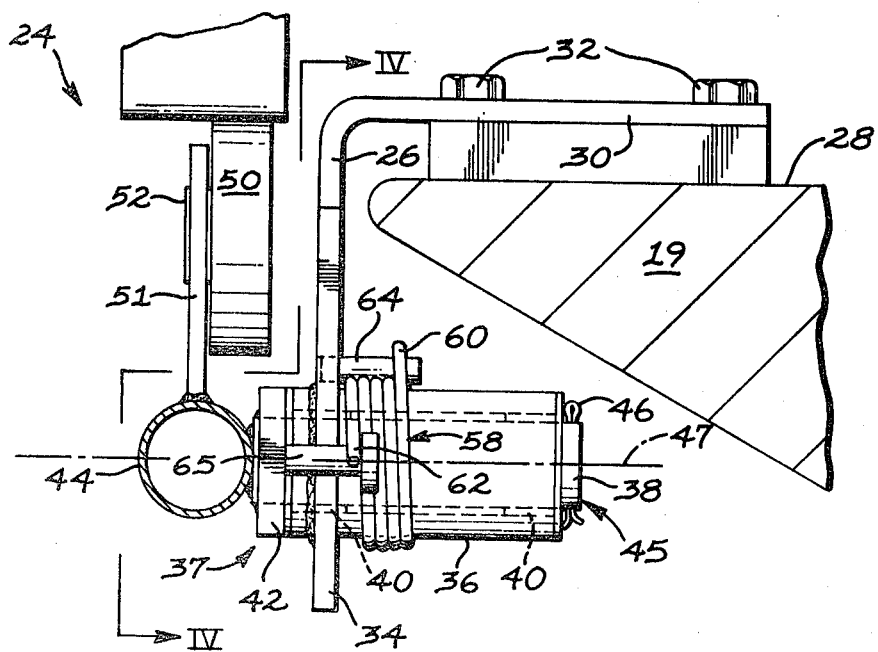

POSITION INDICATOR FOR A TRUCK BODY

DESCRIPTION

1. Technical Field

This invention relates to indicators and more particularly to indicators that are associated with material hauling vehicles, to indicate the position of the truck body of said vehicle.

2. Background Art

In the operation of a material hauling vehicle, such as a dump truck or off-highway truck, the vehicle is provided with a truck body that is loaded at one location with material, such as dirt, and driven to another location to unload the material. To accomplish this, the truck body is designed to be tilted rearwardly with respect to the vehicle frame to allow the material to fall from the truck body. Generally the tilting or raising of the truck body is accomplished by the application of fluid under pressure to one or more hydraulic cylinders that are positioned between the truck body and vehicle frame. Upon completion of the dumping operation the fluid is released from the hydraulic cylinder and the weight of the dump body will cause its return to its original or hauling position.

Occasionally, through a malfunction in the hydraulic circuitry or through an operator's error, the descent of the truck body will be cut short, leaving the truck body in an elevated position. Should the operator drive the vehicle away from the dump site, in this condition, the truck body could extend high enough to interfere with overhead structures.

In some instances truck bodies have been provided with an indicator that extends from the truck body to a position that is visible to the operator as he sits in his seat, when the truck body is fully lowered. These devices are only visible when the truck body is in its proper position for roading. There is no provision of a warning device to indicate a possible problem that would be present if the truck body failed to lower properly.

Electrical devices, such as lights and horns have also been provided to indicate the positioning of the truck body in the elevated position. The electrical componentry, however, has often proved to be much too fragile to survive the harsh environment that is inherent in the operation of a dump truck.

The present invention is directed to overcoming one or more of the problems as set forth above.

DISCLOSURE OF THE INVENTION

In one aspect of the present invention a mechanical indicating apparatus is provided which will warn the operator that the truck body of the truck is in an elevated condition.

BRIEF DESCRIPTION OF THE DRAWINGS

FIG. 1 is a side elevational view of a dump truck vehicle having an embodiment of the present invention;

FIG. 2 is a partial front view looking in the direction of the arrows on line II—II of FIG. 1;

FIG. 3 is an enlarged sectional view of the present invention taken along line III—III of FIG. 2; and FIG. 4 is an enlarged front view looking in the direction of the arrows on line IV—IV of FIG. 3.

BEST MODE FOR CARRYING OUT THE INVENTION

In FIG. 1, a dump truck 10 is shown which typically includes a frame 12, and a truck or dump body 14 that is pivotally mounted to said frame at a pivot 15. A pair of hydraulic lift cylinders 16 are positioned on each side of the vehicle between the frame and the truck body 14 to lift the dump body from a material hauling position 17 to a dumping position 18. An operator's station or cab 19 is also mounted to said frame at a position that is forward of the main body portion 20 of the truck body but is nested underneath a forwardly extending canopy 22 that overlies the operator's station to afford protection thereof while the truck body is being loaded.

An indicating apparatus shown generally at 24 has a base member 26 secured to the roof 28 of cab 19. As shown in detail in FIGS. 3 and 4, base 26 consists of an angled bracket which has a first leg 30 extending along the cab roof 28 and is secured thereto by bolts 32. The second leg 34 of the base member extends downwardly from the first leg and mounts a cylindrical bushing 36 at its lower end portion 37. A shaft 38 is positioned within said cylinder of bushing 36 and is journalled within a pair of bearings 40 for relative rotation within said bushing. The shaft is attached to a generally flat connecting plate 42 at its forward or left end as viewed in FIG. 3. The connecting plate is sandwiched between the shaft 38 and an indicator rod 44, all of which are fixedly attached to one another by welding or an interference fit so as to rotate as a unit. The rearward end portion 45 of the shaft extends just beyond the end of bushing 36 and has a cotter key 46 positioned therethrough to capture the shaft from all but very slight axial movement with respect to the bushing.

The indicating rod 44 extends from the shaft in a direction that is perpendicular to the axis 47 of the shaft. As viewed in FIGS. 2 and 4, the left end, or first end portion 44a, of rod 44 carries a roller 50 (FIG. 2) which is mounted to an upstanding flange 51 extending from the rod by a pin 52 which allows the roller to rotate thereabout. The roller is in contact with a bracket 54 that extends downwardly from the lower surface 56 of the canopy 22. The right or second end portion 44b of rod 44 has a disc or like member 48 that carries a highly visible indicia.

A torsion spring 58 having two oppositely extending ends 60 and 62 is positioned about the outer periphery of bushing 36. The first end 60 bears in one direction against a pin 64 which extends laterally from the second leg 34 of base 26. The second end 62 bears against another pin 65 which extends rearwardly from connecting plate 42. The ends 60 and 62 of the spring 58 bear on pins 64 and 65 in opposite directions which provides a biasing force that tends to urge pin 65, and thus indicator rod 44, in a clockwise direction, when viewed in FIGS. 2 and 4. In addition to urging the indicator rod into its warning position, the spring force also acts as a damper which prevents the mechanism from bouncing and vibrating as it rests in the stored position.

When the truck body is in its material hauling position 17, contact between the bracket 54 and roller 50 holds the rod 44 in a generally horizontal first position 66, which is out of the operator's view. In absence of contact between the roller 50 and bracket 56, the disc 48 of rod 44 assumes a second position 67 as shown in phantom in FIG. 2. In this position, pin 65, which as previously described extends rearwardly to a position laterally beyond leg 34, is forced into contact with the edge 68 of leg 34 which provides a motion limiter for rod 44.

Industrial Applicability

In normal operation of the dump truck 10, material is loaded into the truck body 14 and it is hauled to a dump site with the truck body in position 17, shown in solid lines in FIG. 1. Upon activation of the hydraulic lift cylinders 16, the truck body is raised to the position 18 indicated in phantom lines in FIG. 1 whereupon the material falls from the confines of the truck body. As the truck body begins its ascent, the canopy will also start to rise. As it does, bracket 54 will also move upwardly and will be followed by the roller mechanism 50 for a predetermined distance due to the biasing force applied to the indicator rod 44 by the torsion spring 58 which urges the rod in a clockwise direction about its mounting shaft 38. The spring urges the roller means to follow the bracket until the pin 65 comes into contact with the side 68 of the base member 26. The rotation of the rod is then stopped at a location which positions the warning disc 48 directly in front of the windshield of the dump truck, which serves to indicate to the operator that the truck body is in a raised condition.

As the dumping operation is completed and the truck body 14 is lowered, the bracket 54 will again come into contact with the roller mechanism 50. The roller mechanism is moved counterclockwise about mounting shaft 38 against the bias of spring 58 until the truck body is completely lowered at which time the indicating disc 48 is held substantially horizontally, out of view of the dump truck operator. Lacking any warning indications in his view, the operator is assured the truck body is in a proper position to be driven to the load site. Conversely, should a malfunction occur which prevents the truck body from returning to its fully lowered position 17, at least a portion of the disc will be visible to the operator and will indicate to him that something has prevented the descent of the truck body to its proper material hauling position.

Other aspects, objects and advantages of this invention can be obtained from a study of the drawings, the disclosure and the appended claims.

I claim:

1. An indicating apparatus (24) for use in a vehicle (10) having a frame (12) and a body (14) pivotally mounted on the frame (12) and being movable between a lowered position and an elevated position (17,18) with respect to the frame (12), comprising:
   means (44,48,50) positioned between said frame (12) and body (14) for mechanically indicating the positioning of said body, said positioning means including an indicator member (44) adapted to be pivotally connected to the frame (12) and being biased for movement from a visually obscured position to a position that is visible from within said vehicle in response to the elevation of said body from said frame so as (14) to indicate the positioning of said body (14) in said elevated position (18).

2. An indicating apparatus (24) adapted for use on a vehicle (10) having a frame (12), an operator's station (19) mounted to said frame (12), a truck body (14) pivotally mounted on said frame (12) and being movable between a hauling (17) and a dumping (18) position comprising:
   means (44,48,50) for indicating the positioning of said truck body (14) in the dumping position (18) having a first end portion (44a) engageable with said truck body (14) when said truck body (14) is in the hauling position (17), and a second end portion (44b) having a visual indicator (48) mounted thereon, said indicating means being pivotally mounted to said vehicle frame (12), said second end portion (44b) being biased toward a position (67) wherein the visual indicator (48) is visible from said operator's station (19) only when said truck body (14) is moved toward the dumping position (18).

3. An apparatus (24) as set forth in claim 2 wherein a torsion spring (58) is mounted about said pivot mounting (36,38) to bias said rod indicating means to said position (67) wherein the visual indicator (48) is visible from said operator's station (19).

4. In a vehicle (10) having a frame (12), a cab (19) mounted on said frame (12), and a truck body (14) pivotally mounted on said frame (12) for movement between a hauling position (17) and a dumping position (18), the improvement comprising:
   a rod (44) having a first end portion (44a) and a second end portion (44b) and being pivotally mounted (36,38) to said vehicle cab (19) so as to be movable between a first (66) and a second position (67);
   means (50) for engaging said truck body (22) connected to said first end portion (44a) of said rod (44);
   a visual indicator (48) connected to said second end portion (44b) of said rod (44); and
   means (58) positioned between said vehicle cab (19) and said rod (44) for biasing said rod (44) toward said second position (67) in absence of contact with the truck body (14) wherein said visual indicator (48) is visible from within said cab (19).

5. The improvement as set forth in claim 4 wherein said visual indicator (48) is visually obscured from within said cab (19) when said rod (44) is in said first position (66).

6. The improvement as set forth in claim 4 wherein the engagement means (50) on said first end portion (44a) of said rod (44) is in contact with said truck body (14) when said rod (44) is in said first position (66) and said engagement means (50) is removed from contact with said truck body (14) when said rod (44) is in said second position (67).

7. The improvement as set forth in claim 4 wherein the engagement means further comprises a roller assembly (50) rotatably mounted on said first end portion (44a) of said rod (44).

8. The improvement as set forth in claim 4 wherein said biasing means (58) includes a torsion spring (58) positioned about said pivotal mounting (36,38) of said rod (44) to urge said rod (44) toward its second position (67) upon the absence of contact between said first end portion (44a) of said rod (44) and said truck body (54).

9. The improvement as set forth in claim 4 wherein said pivotal mounting further comprises:
   a base member (26) having first and second leg members (30,34) positioned at an angle to one another;
   a bushing (36) connected at one end to said second leg member (34);
   a plate member (42) having a laterally extending pin (65) mounted thereon and being fixedly attached to said rod (44);
   a shaft (38) having one end fixedly attached to said plate (42), said shaft (38) being positioned within said bushing (36);

means (40) positioned between said shaft (38) and said bushing (36) for allowing relative rotation therebetween;

a pin (64) fixedly connected to said second leg member (34) so as to extend laterally therefrom and being positioned adjacent said bushing (36); and a torsion spring (58) having first and second ends (60,62), said first end (60) being engaged with the pin (64) extending from the second leg member (34) of said base member (26) and said second end (62) being engaged with the pin (65) extending from said plate member (42), said torsion spring (58) being positioned about said bushing (36).

* * * * *